United States Patent [19]

Johnson

[11] 4,111,085
[45] Sep. 5, 1978

[54] COMPOUND CURVATURE CUTTING MACHINE

[75] Inventor: George William Johnson, Smyrna, Ga.

[73] Assignee: Lockheed Corporation, Burbank, Calif.

[21] Appl. No.: 781,694

[22] Filed: May 10, 1977

[51] Int. Cl.² .................. B26D 3/10; B23D 53/08
[52] U.S. Cl. ............................. 83/1; 83/4; 83/801; 83/811; 83/813
[58] Field of Search .................. 83/809–813, 83/789, 798, 4, 1, 171, 661, 801; 144/119 R, 121

[56] References Cited

U.S. PATENT DOCUMENTS

| | | | |
|---|---|---|---|
| 1,383,133 | 6/1921 | Luke | 83/4 |
| 1,631,927 | 6/1927 | Dietrich | 83/488 X |
| 2,504,071 | 4/1950 | Esak | 144/121 X |
| 2,691,206 | 10/1954 | Kautz | 83/797 |
| 2,821,254 | 1/1958 | Kernen | 83/4 |
| 3,254,684 | 6/1966 | Hawkins | 83/801 X |
| 3,259,004 | 7/1966 | Chisholm | 83/171 |
| 3,395,204 | 7/1968 | Olsson et al. | 83/661 |
| 3,757,617 | 9/1973 | Fabbri | 83/1 |
| 3,850,061 | 11/1974 | Wirstrom | 83/4 |
| 3,926,086 | 12/1975 | Crane | 83/801 |

FOREIGN PATENT DOCUMENTS

| | | | |
|---|---|---|---|
| 458,120 | 12/1950 | Italy | 83/4 |
| 264,570 | 3/1971 | U.S.S.R. | 83/661 |

*Primary Examiner*—J. M. Meister
*Attorney, Agent, or Firm*—Albert L. Carter

[57] ABSTRACT

A machine for cutting compound curvature surfaces on a workpiece by a linear or longitudinally extending straight line cutting element that is adjustably movable relative to the workpiece located on a bed of the machine. The cutting element is relatively movable or adjustable to the machine bed in any one of five variable axes or directions, as well as movable or adjustable about any two or more of the five axes or directions of movability and adjustability.

6 Claims, 11 Drawing Figures

Fig. 2A
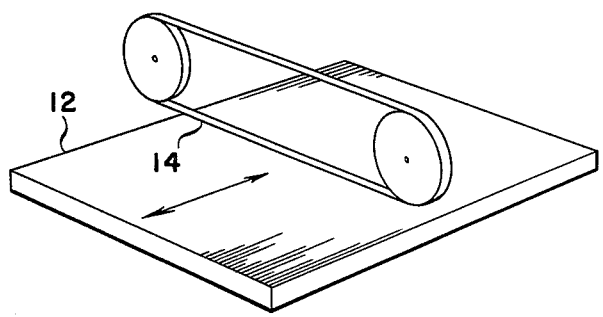
Fig. 2B
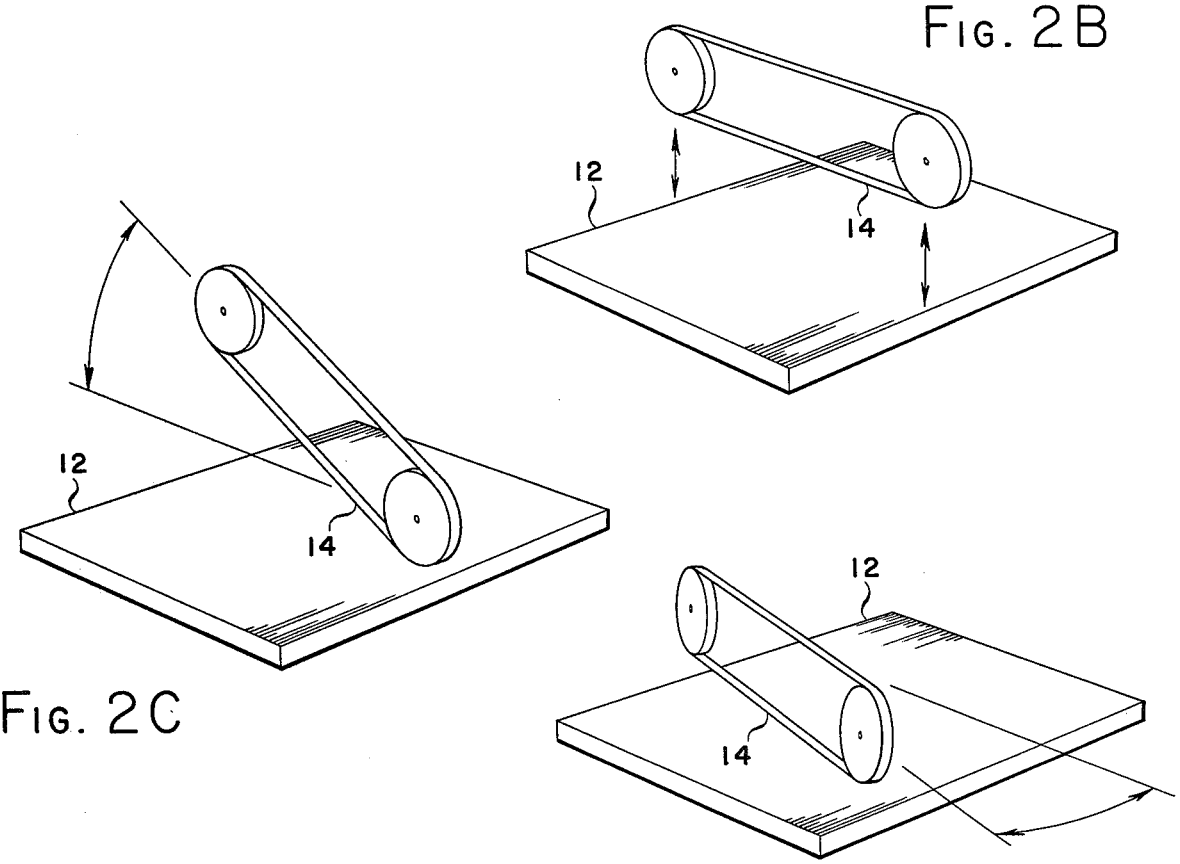
Fig. 2C
Fig. 2D
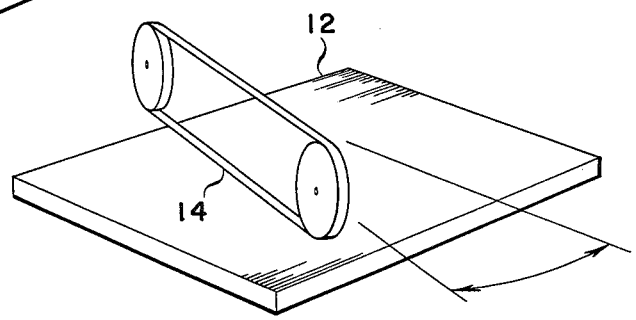
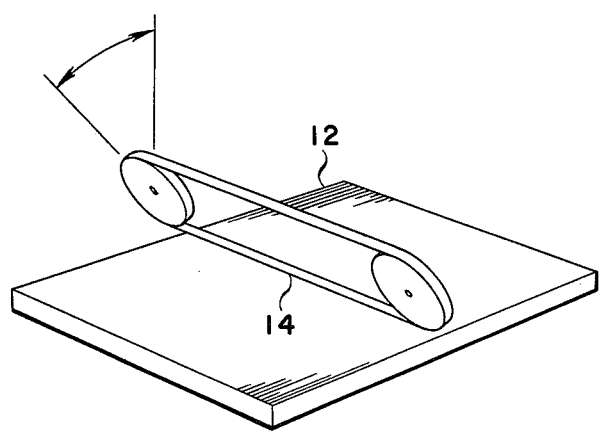
Fig. 2E

COMPOUND CURVATURE CUTTING MACHINE

This invention relates to a compound curvature cutting machine whereby compound curvature surfaces having a plurality of variable curvature axes may be formed on the surface of a workpiece, and more specifically, a machine for forming variable compound curvature surfaces on low density materials such as, but not limited to, composite or metallic honeycomb, various foamed plastics, and low density wood and pressed wood products.

In recent years the advanced structural design arts have featured stiff composite envelopes stabilized with sound absorbing, low density fillers having high stength/weight ratios; the fillers including shapes formed from such materials as composite or metallic honeycombs, various foamed plastics, and low density wood in compressed wood products as well as other low density materials. A great disadvantage of the advanced structural designs has been the excessive cost of producing them, principally due to the difficulties of contouring or shaping the filler bodies.

Machines to accomplish a portion of the overall achievements of this invention are known in the prior art as exemplified by U.S. Pat. No. 2,856,672 issued to Gregg et al, and which is limited to honeycomb or other workpieces having a patterned set of holes or passages therethrough. Also, such machines require specially formed workpiece holding tooling for each operation on each configuration of workpiece. By permitting the cutting element to operate in its conventional straight-line manner and environment (i.e., without bending or deflecting the cutting element from its normal operating straight-line cutting path) through the avenue of relative adjustment between the straight-line cutting path and the workpiece surface as accomplished by the machine of this invention, it is found that the quantity of special tooling for cutting compound surfaces on various workpieces, and the expense or cost therefor, are substantially reduced.

Accordingly, it is the object of this invention to provide multiple axes cutting equipment whereby compound curvature surfaces can be generated on a workpiece with a minimum number of cutting operations and special tooling.

Another object of this invention is to provide multiple axes cutting equipment whereby compound curvature surfaces can be generated on a workpiece with closer tolerances and smoother finish surfaces.

Still another object of this invention is to provide multiple axes cutting equipment with which compound curvature surfaces can be generated on a workpiece more efficiently Further objects and advantages of this invention will become apparent from the following description taken in connection with the accompanying drawings in which:

FIG. 1 is an overall perspective view of the preferred embodiment of this invention showing a gantry movable cutting device mounted on a workpiece receiving machine bed;

FIG. 2 consists of five schematic presentations A through E showing the relative adjustments or movements between the gantry mounted cutting device and the machine bed;

Generally stated, this invention comprises a gantry arrangement combined with a machine bed and drivingly interconnected so that relative motion between the gantry and bed can be accomplished in a direction longitudinally to the bed. A cutting means is mounted to the gantry structure to extend width-wise across the machine bed and includes means for four axes adjustment of the cutting element or member relative to the machine bed: the four axes adjustment control means being mounted on the gantry and when combined with the horizontal movement of the gantry longitudinally relative to the machine bed constitutes a cutting machine capable of movement or adjustment in up to five axes. The gantry mounted cutting member may be of a continuous band saw blade of flat or round cross-sectional configuration and utilizing various tooth and edge shapes as well as abrasives bonded on cutting materials, or a hot wire consisting of a heated cutting wire; all these cutting devices being well known in the prior art and forming a straight-line cutting element. The specific cutting element or member chosen or utilized will depend upon the workpiece material and the cutting method desired since each cutting method will have limitations of smoothness, tolerance and suitability of finished workpiece usage.

Figure 1:
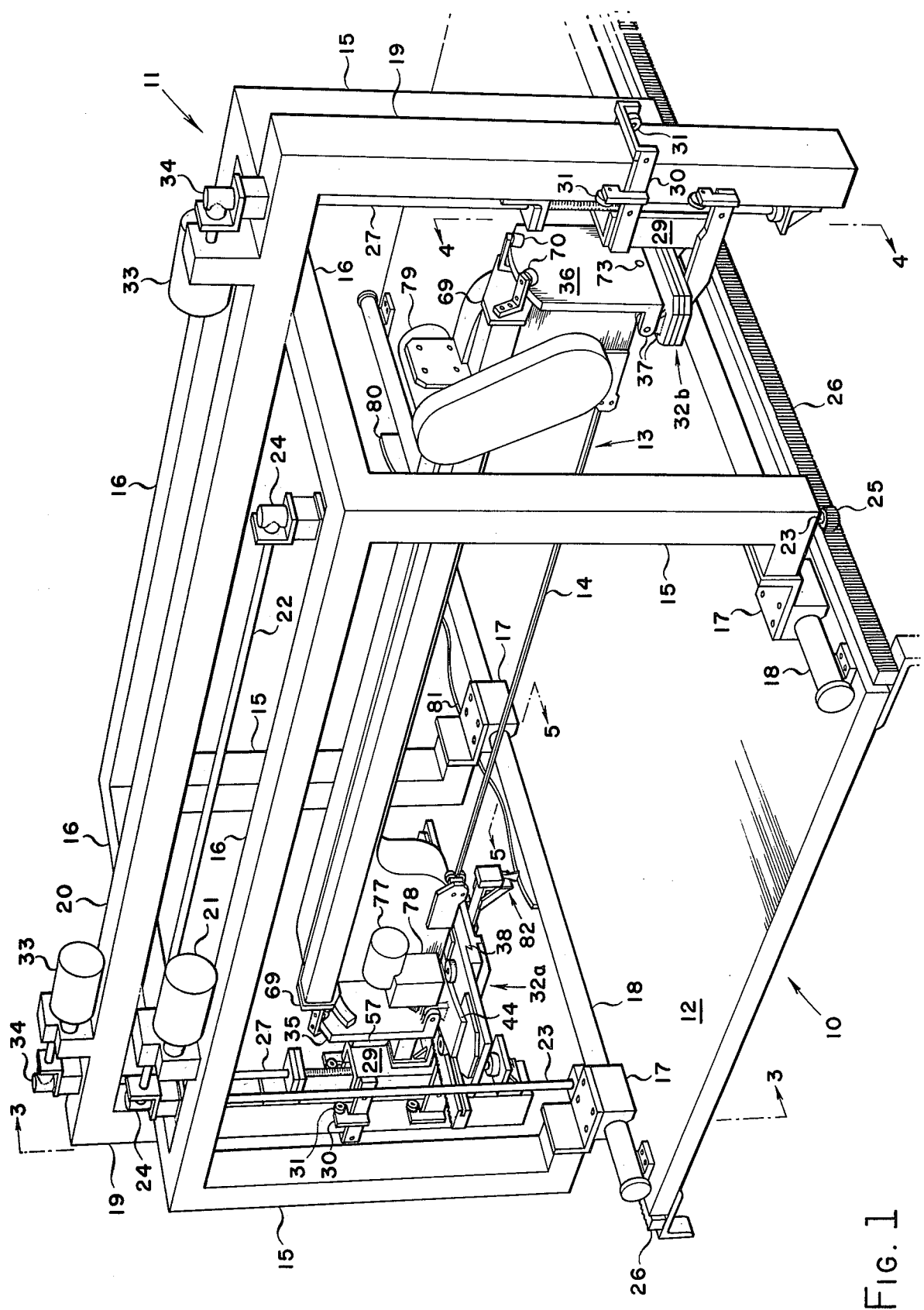

More specifically, with reference to FIG. 1 of the drawings, the machine 10 of this invention comprises a gantry assembly 11 connected to a machine bed assembly 12 in a manner to permit relative movement therebetween: that is, the gantry may be located in a level and stationary manner relative to the location floor with the bed assembly 12 movable longitudinally (as seen in FIG. 1) relative to the gantry, or vice versa, the bed assembly 12 may be located in a level and stationary relationship at the floor location with the gantry 11 moveble relative to bed assembly 12. The preferred embodiment, in that shown in the drawings, is that of the latter arrangement whereby the gantry 11 is movable relative to the fixed bed assembly 12.

A cutting means assembly 13 containing a cutting element 14 (such as for example a continuous band saw of any of the available cross-sectional shapes and containing any of a variety of external surface configurations for removal and/or surface finishing of the workpiece involved, or a conventional hot-wire cutting element) is mounted to gantry 11 in such manner that adjustment or movement of cutting element 14 relative to the surface of bed assembly 12 may be made in four of the five axes that cutting element 14 is capable of moving relative to the surface of bed assembly 12 with the machine of this invention described below; the fifth axis capability of this machine being the longitudinal movement of cutting element 14 relative to the surface of bed assembly 12 as also explained in more detail hereinafter.

Before proceeding with description of specific details for various axis adjustments of the depicted embodiment of this invention, reference is first made to FIGS. 2A through 2E for schematic definition of the various axis movements or adjustments. FIG. 2A depicts the relative movement between bed assembly 12 and cutting element 14 in a longitudinal and parallel manner which in the preferred embodiment (as stated above) the cutting element 14 moves relative to bed assembly 12. This movement is considered to be movement or adjustment along the X-axis.

FIG. 2B shows the relative vertical movement or travel between cutting element 14 and machine bed 12 occasioned by vertical travel of cutting element 14 on the gantry assembly 11. This movement is considered as adjustment or movement along the Y-axis.

FIG. 2C is similar to FIG. 2B, but with relative vertical movement or travel between only one end of the cutting element 14 and machine bed 12 by vertical travel of only one end of the cutting element 14 on the gantry assembly 11 while the opposite end of the cutting element 14 is vertically stationary relative to the gantry assembly 11. This movement is known as an Angle-a adjustment, or adjustment around the X-axis. Likewise, movement or adjustment in this mode can consist of simultaneous movement of both ends of cutting element 14 in opposite directions or both sides in the same direction differentially for such Angle-a adjustment or movement.

FIG. 2D shows adjustment where pivotal movement of one end of cutting element 14 relative to its other end, the swinging movement of one end of cutting element 14 in being a horizontal and parallel direction relative to the machine bed 12; which movement is known as an Angle-b adjustment, or adjustment around the Y-axis.

FIG. 2E depicts the deflection or tilt of the cutting element 14 relative to the vertical axis of gantry assembly 11; such deflection or tilt axis being perpendicular to the vertical axis of the gantry 11 when cutting element 14 extends laterally across bed 12 and parallel thereto. This type of movement is identified as or called an Angle-c adjustment around the Z-axis.

Figure 5:
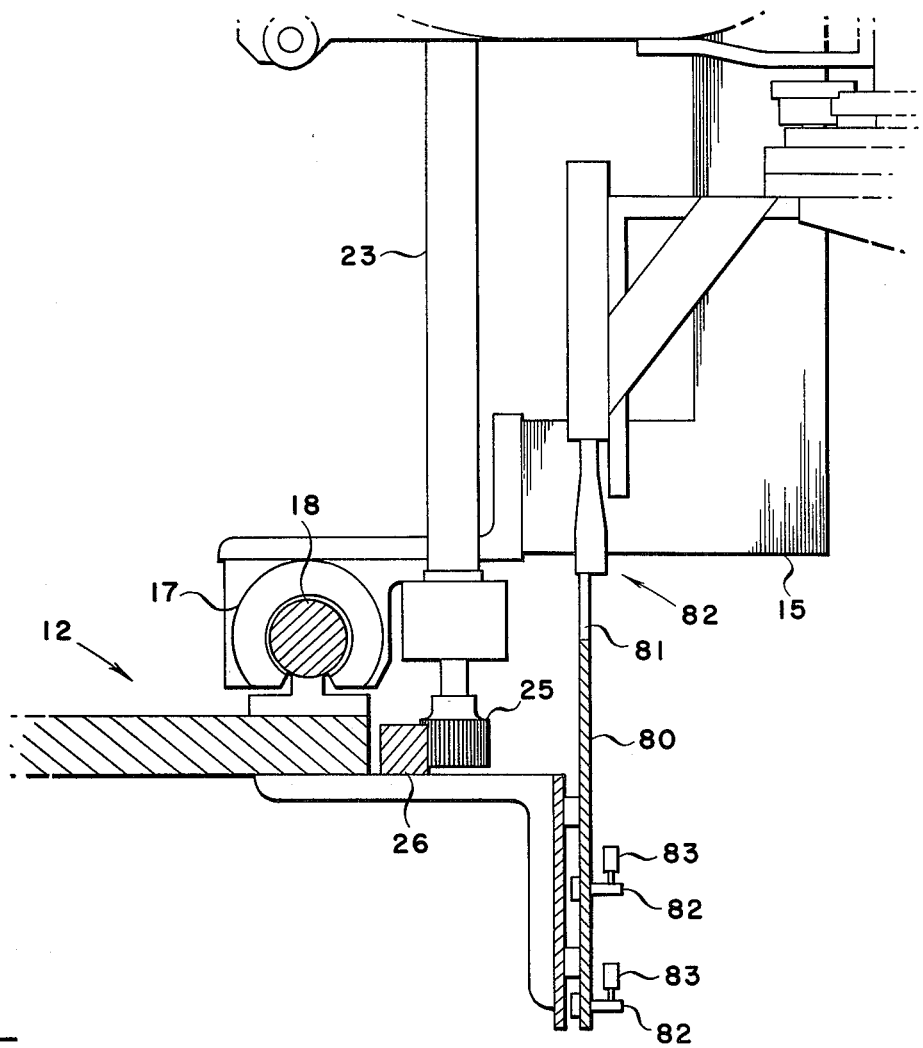
FIG. 5 is a partial cross-sectional view taken along line 5—5 of FIG. 1.

With regard to the adjustment depicted in FIG. 2A, or movement along the X-axis, reference is now made specifically to FIGS. 1 and 5. Gantry assembly 11 comprises at least four vertical column members 15 rigidly interconnected at their upper ends by horizontal members 16. The lower ends of vertical column members 15 having depending or extending therefrom a guideway means 17 adapted to fit on and be directed by guiderails 18 mounted longitudinally along opposite edges of bed assembly 12. Members 15 and 16 of gantry assembly 11 constitute somewhat of a frame or saddle for a mounting or holding assembly for the cutting means assembly 13; such mounting or holding assembly comprising a pair of vertical column members 19 interconnected with a horizontal member 20 extending over and secured to a pair of opposite horizontal members 16 of the gantry 11 frame. The details of mounting and adjustment of the cutting means assembly 13 to the vertical members 19 for adjustments relative to bed 12 will be explained in more detail thereinafter.

Horizontal movement of gantry 11 relative to bed 12 (adjustment along the X-axis) is accomplished by a motor or power means 21 mounted on one of the horizontal members 16 for rotationally driving a shaft 22 that extends substantially parallel to said horizontal member 16. Shaft 22 in turn is drivingly connected to a pair of vertical shafts 23 through their appropriate right angle gear means 24; the vertical shafts 23 extending downwardly to the proximity of the bed 12 and each having a pinion gear 25 that in turn engages with a rack 26 mounted on each side of the bed assembly 12. Motor 21 is reversible, and control therefor, which is not shown and forms no part of this invention, may be under the manual control of the machine operator or any type of numerical control or other types of machine tool control adapted to operate a conventional type of machine tool of this invention. Thusly, it can be seen that horizontal travel or adjustment of the gantry assembly 11 relative to the bed assembly 12 is accomplished so that all four vertical column members 15 are moved uniformly when adjustment or movement of the cutting means assembly 13, and hence cutting element 14, relative to bed 12 along the X-axis of the machine is made.

For description of details that permit the vertical travel of cutting means assembly 13 relative to bed 12 (i.e., adjustment along the Y-axis) reference is now made to FIGS. 1, 3, 4, and 7.

A screw threaded shaft 27 is mounted vertically relative to each vertical column member 19 and engages a threaded nut or ball screw means 28 contained within a frame means 29, which in turn has appropriate straps 30 and guide roller devices 31 extending therefrom and arranged around vertical column members 19 in such manner that the guide rollers 31 will be in rolling contact therewith as shaft 27 is rotated in either direction to cause each of the frame means 29, and its associated nut 28, to move vertically upward or downward relative to vertical columns 19 depending upon which direction shaft 27 is rotated. Each frame means 29 has a shelf or ledge assembly 32a or 32b rigidly connected thereto on which the cutting means assembly 13 is mounted or connected to so that as shafts 27 are rotated concurrently and at the same speed, the cutting element 14 is moved vertically toward or away from the bed assembly 12, which in turn results in the movement of the cutting element 14 along the Y-axis as depicted in FIG. 2B above. Rotational drive of shafts 27 is accomplished by a separate drive motor 33 for each shaft 27 operating through a right angle drive means 34. Control of the motors 33 may be accomplished through any appropriate control means as discussed above relative to motor 21, as well as by a camming control arrangement described hereinafter.

Figure 7:
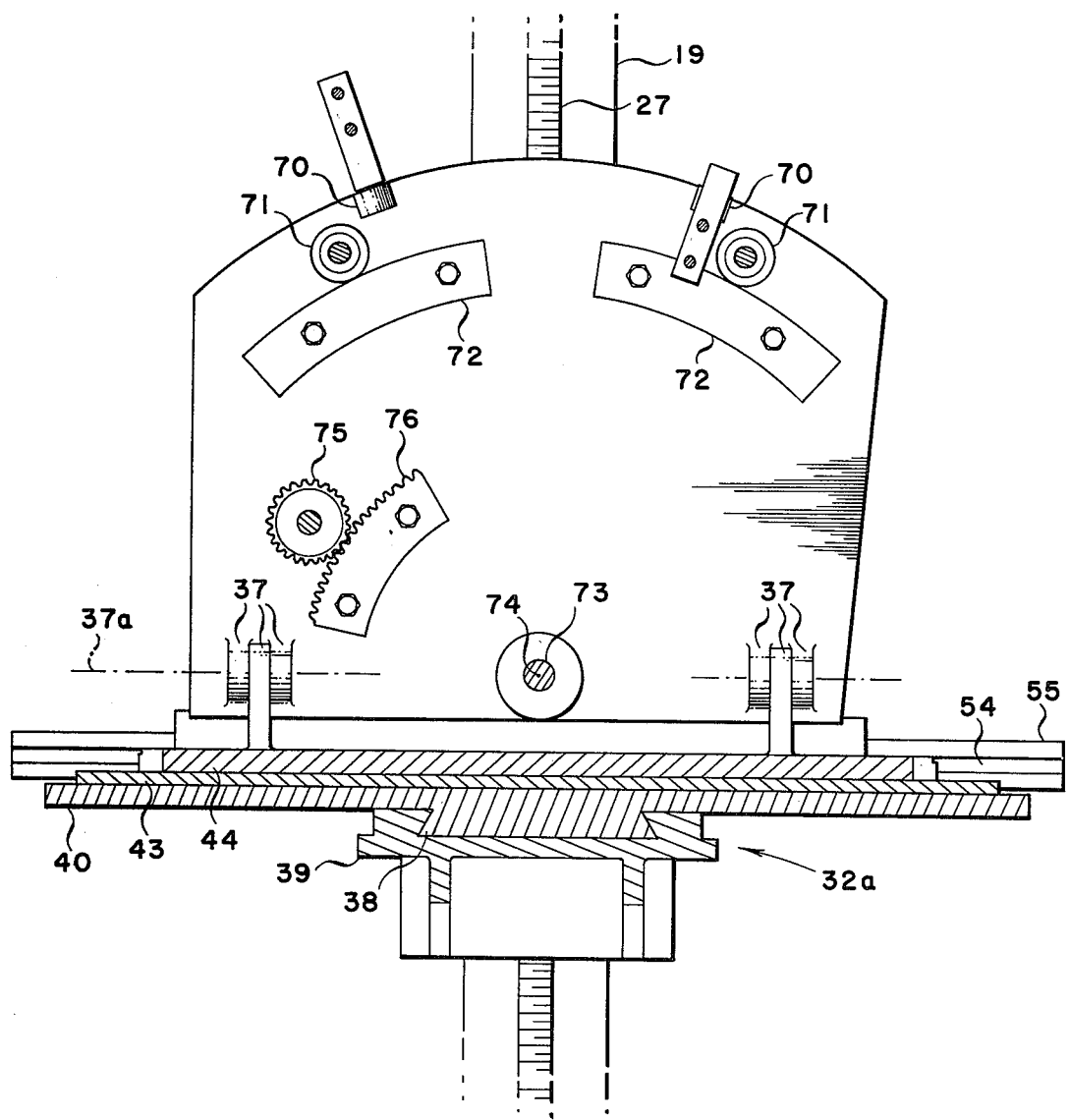

Each end of the cutting means assembly 13 is pivotally connected to its respective shelf or ledge assembly 32a or 32b by pins extending through aligned holes in ears or tabs 37 appropriately extending from shelf assemblies 32a and 32b and end plates 35 and 36 so as to permit relative pivotal movement between the end plates 35, 36 and shelves 32a and 32b about an axis defined by line 37a in FIG. 7.

By virtue of these pivotal connections and a separate motor 33 for each of the screw shafts 37, the cutting element 14 may be angulated relative to bed 12 about Angle-a (or adjustments around the X-axis) as depicted above in FIG. 2C by the selective or differential operation of the two motors 33. In other words, the end of cutting means assembly 13 adjacent one of the vertical column members 19 may be raised or lowered relative to the other end of cutting means assembly 13, and hence cutting element 14, to provide such angulated adjustment. Additionally, it is to be recognized that concurrent movement or adjustment of the cutting element 14 relative to bed 12 in both the Y-axis and about Angle-a can be accomplished by the simultaneous operation of both motors 33 in either opposite directions or in the same direction but at different speeds.

The shelf assembly 32a, to which one end of cutting means assembly 13 is mounted, includes a keyed slide joint 38, as best seen in FIGS. 1 and 7, which permits compensation or adjustment for the hypotenuse dimensional changes between shelf members 32a and 32b as variable vertical relationships take place between both shelf members 32a and 32b and the surface of bed 12, as Angle-a adjustments or movements are made.

For description of the structural arrangement to permit adjustment or movement of cutting element 14 relative to bed 12 about Angle-b (angular movement around the Y-axis) as depicted above in FIG. 2D, reference is now made to FIGS. 1, 3, 4 and 6.

The shelf or ledge assembly 32a comprises a pair of lower plate members 39 and 40 mounted on a pair of cantilever support arms 41: the plate members 39 and 40 being keyed together to form the keyed slide joint 38 discussed above. Secured to plate 40 is a right-angled intermediate plate member 42 having a slide pad member 43 mounted on the upper surface thereof. An upper plate member 44 is located such that its bottom surface is in slideable engagement with the upper surface of slide pad 43 (it being noted it is specifically the upper plate member 44 to which the ears or tabs 37 discussed above are mounted on and extend upwardly therefrom). Upper plate 44 is retained in sliding engagement with pad 43 by a plurality of guide rollers 45, 46, 47, 48 and 49 that are rotationally mounted on the upper surface of plate 42 in such manner that the rotational shoulders of rollers 45 and 46 ride in a right angle cut-out 50 extending along one edge of plate 44 and the rotational shoulders of rollers 47, 48 and 49 ride in a right angle cut-out 51 extending along the opposite edge of plate 44; the right angle cut-outs 50 and 51 being slightly arcuate in a longitudinal sense as explained in more detail hereinafter.

Figure 3:
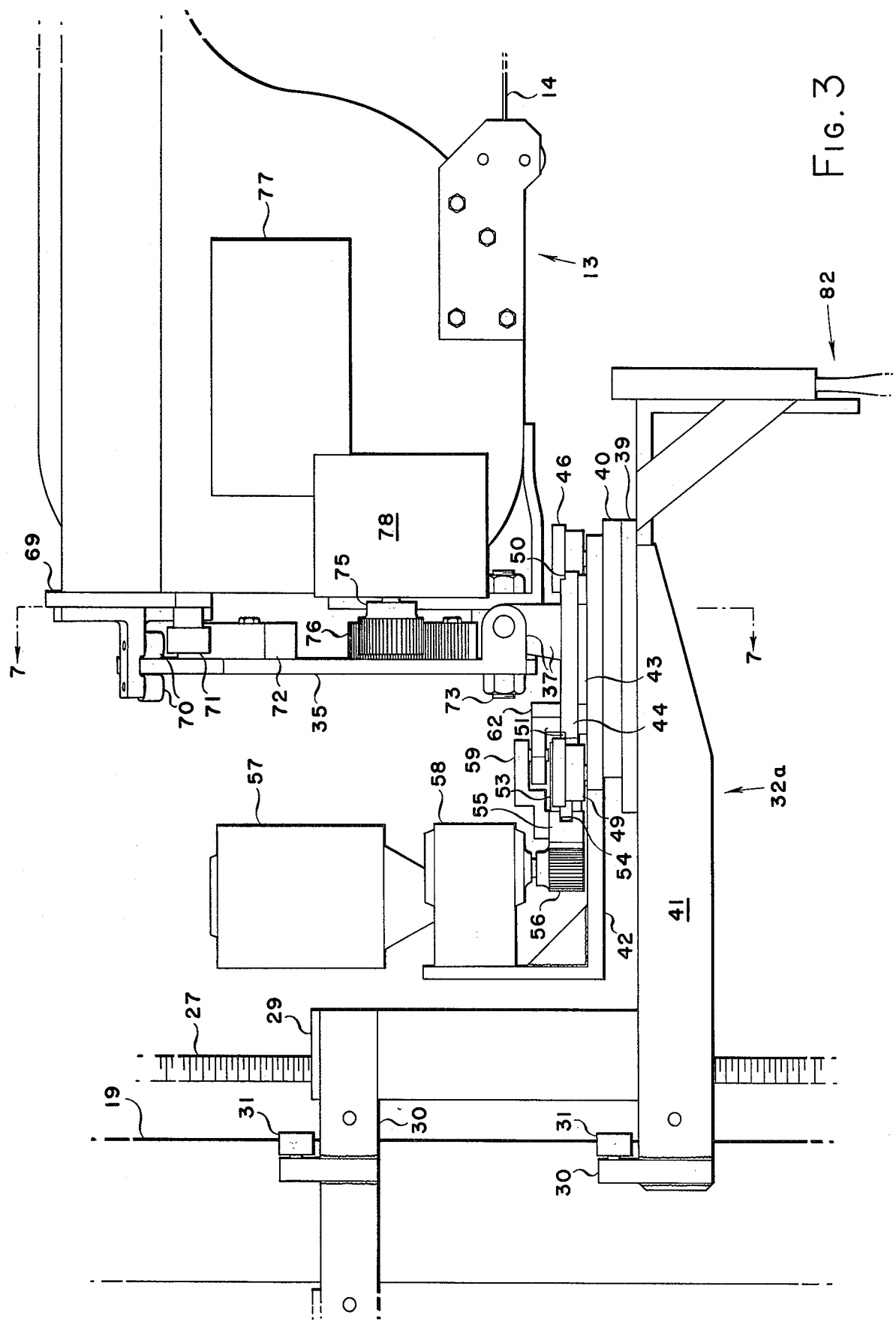
FIG. 3 is a view taken along line 3—3 of FIG. 1.

An additional pair of guide rollers 52 and 53 are rotationally mounted on plate 42; the rollers 52 and 53 having a medial step circumferentially therearound to ride in a slide or groove 54 extending lengthwise in a longitudinally extending rack member 55. Rach 55 is horizontally retained into rolling engagement with rollers 52 and 53 by a pinion 56 extending from a motor 57 and gear box 58 mounted to plate member 42 as best seen in FIG. 3; and concurrently, rack 55 is held in vertical alignment with rollers 52 and 53 and pinion 56 by the circumferential step on rollers 52 and 53 riding in channel 54 of rack 55.

A crank member 59, having a pin member 60 depending therefrom, is securely connected to rack 55 and extends outwardly therefrom with pin 60 riding in a slot 61 in a crank member 62 mounted to upper plate 44 and extending therefrom; the purpose of this interconnection being explained in more detail hereinafter.

Figure 4:
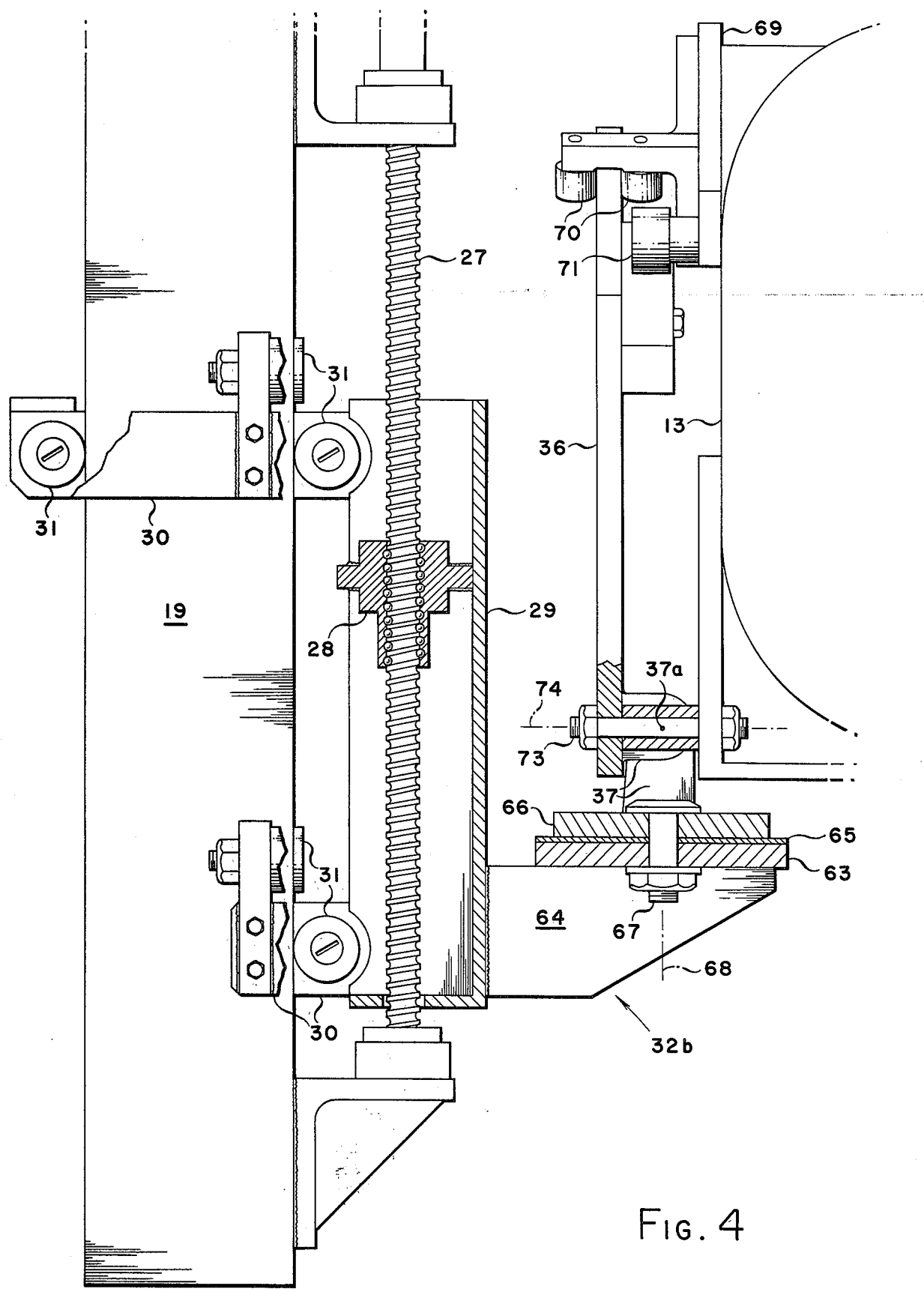
FIG. 4 is a partial cross-sectional view taken along line 4—4 of FIG. 1.

The interconnection between cutting means assembly 13 and shelf assembly 32b, (as best seen in FIG. 4), structurally consists of a lower plate member 63 securely mounted to support arms 64 of shelf assembly 32b with a slide pad 65 securely fastened to plate 63 with an upper plate 66 (to which the pivot ears or tabs 37 are mounted for pivotal connection cutting means assembly 13 as described above). The plates 63 and 66 are pivotally assembled relative to each other by a bolt or pin 67 to permit relative rotation between plates 63 and 66 about a vertical axis defined by line 68.

Figure 6:
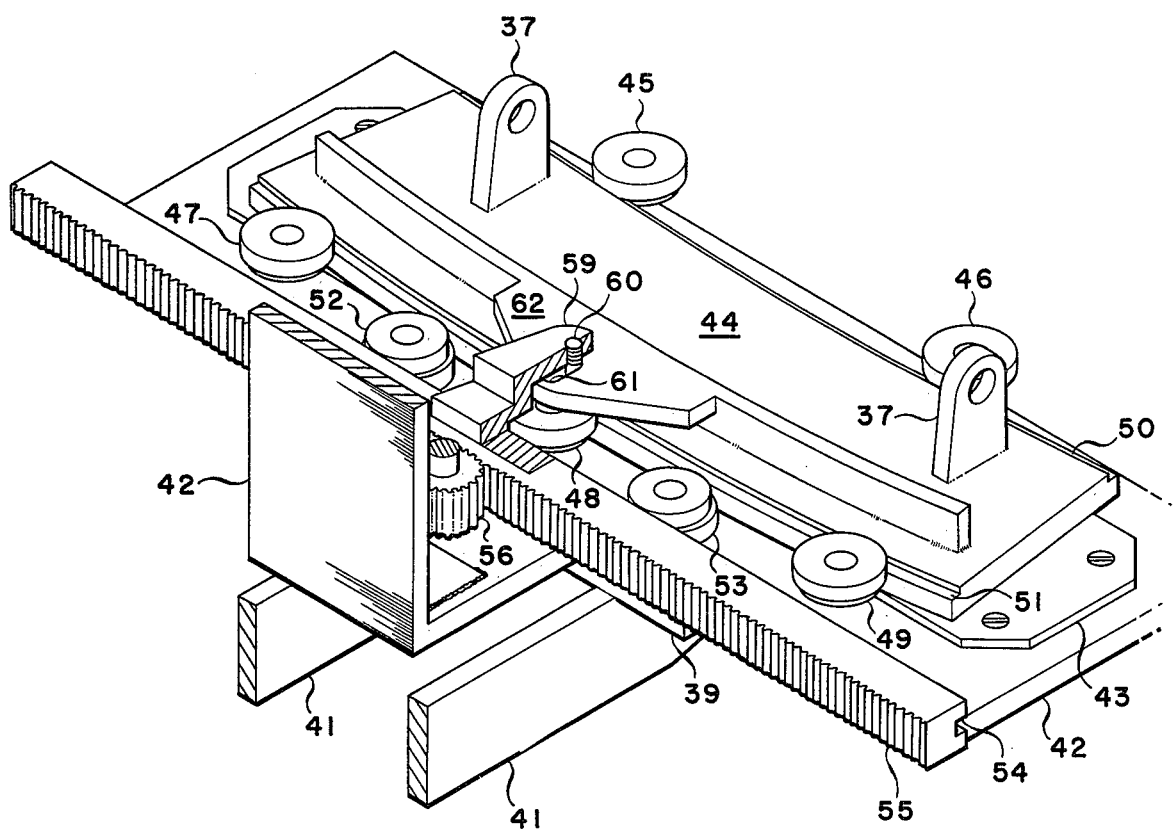
FIG. 6 shows further details of the mechanism for adjusting or moving the gantry mounted cutter device relative to the machine bed as shown in FIG. 2D; and, FIG. 7 is a view taken along line 7—7 of FIG. 3.

In operation, adjustment or movement of cutting element 14 relative to bed 12 about Angle-b (movement around the Y-axis) as shown above in FIG. 2D is accomplished by rotation of pinion 56 in one direction or the other, which in turn causes rack 55 to move in a respective direction longitudinally and rolling contact with the rollers 52 and 53 on plate 42. This movement of rack 55 in turn moves plate 44 relative to plate 42 by virtue of the pinned connection between crank members 59 and 62 and thereby causes the end of cutting means assembly 13 connected to shelf assembly 32a to move arcuately relative to the end of cutting means assembly 13 pivotally connected to shelf assembly 32b by pin 67 as described above. In view of this type of connection, it can be readily seen that the radius of the right angle cut-outs 50 and 51 on plate 44 will correspond to the linear distance between the respective cut-out and the axis 68 of pin 67. Also, it can be easily and readily understood by reference to FIG. 6 that for a minor sliding movement of plate 44 relative to 42, plate 44 is held or retained by all five of the guide rollers 45, 46, 47, 48 and 49, whereas movement of plate 44 to larger degrees or extent of adjustment relative to plate 42 results in plate 44 being retained or held by at least three of the guide rollers in a three point triangular type contact: i.e., as plate 44 is moved upwardly and leftwardly as seen in FIG. 6, plate 44 is held and retained in its position through the contact with guide rollers 45, 47 and 48, and that when plate 44 is moved rightwardly and downwardly as seen in FIG. 6, the plate 44 is held and retained through the contact with guide rollers 46, 48 and 49.

The fifth or final type of adjustment for cutting element 14 relative to bed 12 (as shown in FIG. 2E) is the tilt or adjustment of cutting means assembly 13 about a vertical plane defined by the vertical column members 19 of gantry assembly 11 through the interconnection of cutting means assembly 13 to end plates 35 and 36 now to be described with reference to FIGS. 1, 3, 4 and 7. Cutting means assembly 13 is provided with an appropriate plate member 69 at each upper end thereof, to which are mounted a plurality of roller means 70 and 71 for rolling engagement or contact with the respective end plates 35 and 36. Rollers 70 are arranged in pairs and gapped substantially the thickness of end plates 35 and 36 so that one roller of each pair of rollers 70 is in rolling contact with the opposite sides of their respective end plate 35 or 36. Rollers 71 are mounted about a horizontal axis for rolling engagement with appropriate surfaces of arcuate cam members 72 and mounted respectively on the sides of both end plates 35 and 36 confronting the cutting means assembly 13. The cutting means assembly 13 is also pivotally connected to each end plate 35 and 36 by a pin or bolt 73 at the lower portions of end plates 35 and 36. The center line of the bolts or pins 73 are placed in alignment to form an axis 74 about which cutting means assembly 13 can pivot relative to both end plates 35 and 36.

This pivoting of cutting means assembly 13 relative to end plates 35 and 36 is (which constitutes an Angle-c movement or adjustment about the Z-axis) accomplished by a pinion 75 engaging an arcuate rack segment 76 securely mounted on end plate 35; the pinion 75 being driven by a motor 77 through a reduction gear box 78 that are mounted on the cutting means assembly 13.

The various adjustments or movements of the cutting means assembly 13 to permit the adjustments or movements of the cutting element 14 relative to bed 12 as described above is mechanically attainable by the expediency of locating the axes 37a and 74 associated with shelf assembly 32a so that they intersect at right angles with each other, and likewise locating axes 37a, 68 and 74 associated with shelf assembly 32b so that they all intersect with each other at right angles as best seen in FIGS. 4 and 7. Additionally, it is believed most efficient and economical for calculating the various adjustment control signals and interrelationships if the cutting point line in the case of a flat band saw and the center of round, continuous cutting members or hot wires are located coextensively with the pivotal axis 74 described above for the Angle-c movement about the Z-axis.

As stated above, the cutting element 14 may be a continuous band saw blade of flat or round cross-sectional shape or a hot wire or other type of longitudinal, straight-line cutting element. When cutting element 14 is a continuous band saw mounted on cutting means assembly 13, its drive is powered by a motor 79 also mounted on cutting means assembly 13: it being recognized that in the case of a hot wire cutting element, appropriate controls and sources of heat for delivery to the hot wire cutting element will be substituted for the motor 79. Also, the precise drive or control mechanism for powering cutting element 14 may be any of the prior art arrangements and form no part of this invention.

While all of the various movement of adjustment motors 33, 57 and 77 described above may be powered in the same manner as motor 21 such as by manual control, numerical control tapes, computer controlled electronic circuits, etc., it can also be recognized that movements or adjustments of the types shown in FIGS. 2B through 2E may be accomplished by a cam control arrangement as shown in FIGS. 1, 3 and 5. As shown, an appropriate mechanically configured cam plate 80 may be securely mounted along side the edge of bed assembly 12 to present a camming surface 81 for contact by an appropriate vertical sensing means 82, readily available from the prior art for control of either or both motors 33. Also, additional camming or trip members 82 may be mounted on cam plate 81 for tripping or controlling micro-switches 83 as shown in FIG. 5, which in turn can operate on control motors 57 or 77 selectively; it being recognized that although not shown, the micro-switches or control members 83 are connected in an appropriate manner to gantry assembly 11 as is camming sensing means 82. Likewise, it is also to be understood that before any cam control or operation of motors 33, 57 or 77 takes place, motor 21 must be energized for relative motion between gantry assembly 11 and bed assembly 12. Also, while FIG. 1 shows cam plate 80 mounted to one side of bed 12 only, it is to be appreciated that a corresponding cam plate 80 may be mounted on the other side of bed 12; the presence of a cam plate 80 on both sides of bed 12 or only one side thereof being dependent upon the type of camming control desired for the installation involved.

In operation, a compound curvature surface may be formed on a workpiece mounted upon the bed 12 in any appropriate manner or by any appropriate means from the prior art (the workpiece and mounting details not being shown as they do not form a part of this invention), and thereafter moving the cutting element 14 longitudinally relative to the bed assembly 12 as shown in FIG. 2A through the supply of power to motor 21. As such longitudinal travel or movement along the X-axis as shown in FIG. 2A takes place, a compound surface can be generated in the workpiece by appropriate movement or adjustment of the cutting element 14 relative to the bed 12 through the selective energization of one or both motors 33, motor 57 or motor 77 in a selective and predetermined basis so that cutting element 14 is moved relative to the bed assembly 12 in any one or combination thereof of the X-axis, Angle-a, Angle-b and Angle-c movements depicted in FIGS. 2B, C, D and E.

While particular embodiments of the invention have been illustrated and described, it will be obvious to those skilled in the art that various changes and modifications may be made without departing from the invention, and it is intended to cover in the appended claims all such modifications and equivalents that fall within the true spirit and scope of this invention.

What is claimed is:

1. A multi-axis cutting machine for cutting compound curvature surface on a workpiece comprising:
    a machine bed means adapted to receive and retain a workpiece in secure fashion thereon and having a guiderail means extending along two opposite side edges thereof;
    a gantry means movably mounted on said guiderail means whereby a relative longitudinal movement between the gantry means and the machine bed means may be accomplished to constitute movement in an X-axis;
    a cutting means assembly including a straight-line workpiece cutting means member:
    means mounting the cutting means assembly to the gantry means;
    a first means included in said mounting means whereby a relative vertical movement between the cutting means assembly and the machine bed means may be accomplished to constitute movement in a Y-axis for the cutting means member relative to said machine bed means;
    and a second means included in said mounting means whereby a relative horizontal movement between one end of the cutting means assembly and the machine bed means may be accomplished to constitute an Angle-b pivotal movement about the Y-axis, each said first and second means in said mounting means and said movable gantry means independently and variably operable relative to each of the others whereby the surface generated on the workpiece in a single traversement of the X-axis can consist of a compound curvature of any variable combination of straight lines relative to the X-, Y- and Angle-b axes.

2. A multi-axis cutting machine as claimed in claim 1 wherein said mounting means includes a third means whereby a relative vertical movement between only one end of the cutting means assembly and the machine bed means may be accomplished to constitute an Angle-a pivotal movement about the X-axis, said third means also independently and variably operable relative to each of the other said first, second and movable gantry means whereby said workpiece generated surface can consist of a compound curvature of any variable combination of straight lines relative to the X-, Y-, Angles-a and -b axes.

3. A multi-axis cutting machine as claimed in claim 1 wherein said mounting means includes a third means whereby a relative tilting movement between the cutting means assembly and both the gantry means and the machine bed means may be accomplished to constitute an Angle-c pivotal movement about a Z-axis, said third means also independently and variably operable relative to each of the other said first, second and movable gantry means whereby said workpiece generated surface can consist of a compound curvature of any variable combination of straight lines relative to the X-, Y-, Angles-*b* and -*c* axes.

4. A multi-axis cutting machine as claimed in claim 2 wherein said mounting means includes a fourth means whereby a relative tilting movement between the cutting means assembly and both the gantry means and the machine bed means may be accomplished to constitute an Angle-*c* pivotal movement about a Z-axis, said fourth means also independently and variably operable relative to each of the other said first, second, third and movable gantry means whereby said workpiece generated surface can consist of a compound curvature of any variable combination of straight lines relative to the X-, Y-, Angles-*a*, -*b* and -*c* axes.

5. A multi-axis cutting machine as claimed in claim 1 wherein: said first means included in said mounting means comprises a screw threaded shaft rotatively mounted to each end of said gantry means to extend substantially vertical and proximate each end of said gantry means, and a nut member connected to each end of said cutting means assembly and engageable with one of said shafts;

said second means included in said mounting means comprises a pivotal connection means included in the connection between one end of the cutting means assembly and its nut member, said pivotal connection having a vertical axis substantially parallel to the threaded shaft the nut member is engaged with, a horizontally slideable connection means included in the connection between the other end of the cutting means assembly and its nut member that is engaged with the other threaded shaft, said slideable connection means comprising a lower plate member mounted in fixed relation to the threaded shaft engaged nut, an upper plate member mounted to the cutting means assembly and contacting the lower plate member between a plurality of guiderollers connected to the lower plate member and having peripheral retention contact with the upper plate member, a longitudinal rack member movably engageable with guide means on said lower plate member and having a crank member extending therefrom that is engaged with said upper plate member, and motor means mounted on said lower plate member and driving a pinion engageable with said rack member to retain said rack member in contact with said guide means so that as said rack member is moved, the cutting means assembly is horizontally pivoted relative to the gantry means about the vertical pivotal axis between the gantry means and the cutting means assembly at the other end thereof as the rack member crank moves the upper plate whereby the cutting means assembly may be moved relative to the gantry means and the machine bed means through an Angle-*b* adjustment;

and said first means included in said mounting means further comprises reversible motor means for rotating said shafts whereby both ends of said cutting means assembly may be raised and lowered at the same rate simultaneously relative to both the gantry means and the machine bed means for said variably operational movement of the cutting means assembly in any combination of the X-axis, Y-axis, and Angle-*b* directions.

6. A multi-axis cutting machine as claimed in claim 4 wherein: said first means included in said mounting means comprises a screw threaded shaft rotatively mounted to each end of said gantry means to extend substantially vertical and proximate each end of said gantry means, and a nut member connected to each end of said cutting means assembly and engageable with one of said shafts;

said third means included in said mounting means comprises an axially extending pivotal connection means included in the connection between the nut members and the ends of the cutting means assembly with the two pivotal axes parallel to each other and both parallel to the X-axis;

said second means included in said mounting means comprises a pivotal connection means included in the connection between one end of the cutting means assembly and its nut member, said pivotal connection having a vertical axis substantially parallel to the threaded shaft the nut member is engaged with, a horizontally slideable connection means included in the conencton between the other end of the cutting means assembly and its nut member that is engaged with the other threaded shaft, said slideable connection means comprising a lower plate member mounted in fixed relation to the threaded shaft engaged nut, an upper plate member mounted to the cutting means assembly and contacting the lower plate member between a plurality of guiderollers connected to the lower plate member and having peripheral retention contact with the upper plate member, a longitudinal rack member movably engageable with guide means mounted on said lower plate member and having a crank member extending therefrom that is engaged with said upper plate member, and motor means mounted on said lower plate member and driving a pinion engageable with said rack member to retain said rack member in contact with said guide means so that as said rack member is moved, the cutting means assembly is horizontally pivoted relative to the gantry means about the vertical pivotal axis between the gantry means and the cutting means assembly at the other end thereof as the rack member crank moves the upper plate whereby the cutting means assembly may be moved relative to the gantry means and the machine bed means through an Angle-*b* adjustment;

said fourth means included in said mounted means comprises an end plate means pivotally connected to the cutting means assembly at each end thereof, each of said end plate means in turn intermediate the nut member and the cutting means assembly so that the connection between said nut member and said cutting means assembly is through said end plate, the pivotal connections between the end plates and the cutting means assembly located and arranged so that the two axes thereof are longitudinally collinear, gear means interconnecting one said end plate with the cutting means assembly to permit relative rotation therebetween around the axes of said pivotal connections, and a motor means for driving said gear means whereby the cutting means assembly may be rotated relative to the gantry means and machine bed means in an Angle-*c* direction;

and said first means included in said mounting means further comprises reversible motor means for rotating each of said shafts whereby each end of said cutting means assembly may be raised and lowered relative to both the gantry means and the machine bed means in a manner that is either oppositely, simultaneously, and differentially relative to the other end of the cutting means assembly for selective movements of the cutting means assembly in the Y-axis and about the X-axis and thereby effect said variably operational movement of the cutting means assembly in any combination of the X-axis, Y-axis, Angle-$a$, Angle-$b$, and Angle-$c$ directions.

* * * * *